United States Patent
Suzuki (10) Patent No.: US 7,150,192 B2
(45) Date of Patent: *Dec. 19, 2006

(54) ACCELERATION MEASUREMENT METHOD USING ELECTROSTATIC-CAPACITY-TYPE ACCELERATION SENSOR

(75) Inventor: Tamito Suzuki, Fukuroi (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/925,916

(22) Filed: Aug. 26, 2004

(65) Prior Publication Data

US 2005/0022599 A1    Feb. 3, 2005

Related U.S. Application Data

(63) Continuation-in-part of application No. 10/790,440, filed on Mar. 1, 2004, now Pat. No. 7,004,027.

(30) Foreign Application Priority Data

Mar. 3, 2003   (JP)   ............................... 2003-55562
Mar. 3, 2004   (JP)   ............................. 2004-058504

(51) Int. Cl.
    *G01P 15/125*   (2006.01)
    *H01G 7/00*     (2006.01)

(52) U.S. Cl. ................................. 73/514.32; 361/283.3

(58) Field of Classification Search ............ 73/514.32, 73/514.17, 514.18, 514.21, 514.16, 514.01; 361/283.3, 283.1
    See application file for complete search history.

(56) References Cited

U.S. PATENT DOCUMENTS

| 4,711,128 | A |  | 12/1987 | Boura ...................... 73/514.18 |
| 5,151,763 | A |  | 9/1992 | Marek et al. ................ 257/415 |
| 5,618,989 | A |  | 4/1997 | Marek .......................... 73/138 |
| 5,631,422 | A |  | 5/1997 | Sulzberger et al. ...... 73/514.32 |
| 6,041,653 | A | * | 3/2000 | Ichikawa et al. ......... 73/514.32 |
| 6,792,805 | B1 |  | 9/2004 | Murata et al. ........... 73/514.32 |
| 7,004,027 | B1 |  | 2/2006 | Suzuki ..................... 73/514.32 |

FOREIGN PATENT DOCUMENTS

| EP | 00303284 A1 | 2/1989 |
| JP | 07-260510 | 10/1995 |
| JP | 10-206457 | 8/1998 |

* cited by examiner

*Primary Examiner*—Daniel S. Larkin
*Assistant Examiner*—Tamiko Bellamy
(74) *Attorney, Agent, or Firm*—Dickstein, Shapiro, LLP.

(57) ABSTRACT

An acceleration measurement method adapted to an electo-static-capacity-type acceleration sensor comprising a first capacitance detector and a second capacitance detector both of which have moving electrodes and fixed electrodes arranged on a substrate surface so that facing areas therebetween are varied in response to input acceleration, wherein said second capacitance detector sets the facing areas between the moving electrodes and the fixed electrodes to be larger than those of the first capacitance detector when the input acceleration is zero. If first acceleration information representing capacitance variations detected between the moving electrodes and fixed electrodes in the first capacitance detector exceed an upper limit value that is set in advance with respect to the first capacitance detector, it outputs second acceleration information representing capacitance variations detected between the moving electrodes and the fixed electrodes in the second capacitance detector. If not, it outputs the first acceleration information.

3 Claims, 7 Drawing Sheets

ACCELERATION MEASUREMENT METHOD USING ELECTROSTATIC-CAPACITY-TYPE ACCELERATION SENSOR

CROSS-REFERENCE TO RELATED APPLICATIONS

This application is a continuation-in-part application based on U.S. patent application Ser. No. 10/790,440 filed on Mar. 1, 2004, now U.S. Pat. No. 7,004,027, and priority is claimed on Japanese Patent Application Nos. 2003-055562 filed on Mar. 3, 2003 and 2004-058504 filed on Mar. 3, 2004, the contents of which are incorporated herein by reference.

BACKGROUND OF THE INVENTION

1. Field of the Invention

This invention relates to acceleration measurement methods using electrostatic-capacity-type acceleration sensors that detect accelerations based on variations in electrostatic capacity (or capacitance).

2. Description of the Related Art

Conventionally, a typical type of an electrostatic-capacity-type acceleration sensor (as disclosed in Japanese Patent Application Publication No. Hei 7-260510) comprises a capacitance detector having a moving electrode and a fixed electrode, which are arranged opposite to each other such that a separating distance therebetween is varied in response to an input acceleration, wherein a switched-capacitor circuit converts capacitance variation due to displacement of the moving electrode into voltage variation so as to detect and output an acceleration signal, and wherein in order to broaden the detection range, a servo circuit is provided so as to hold the moving electrode at a neutral position by feeding back the acceleration signal.

Another type of the electrostatic-capacity-type acceleration sensor (as disclosed in Japanese Patent Application Publication No. Hei 10-206457) comprises a moving electrode and a fixed electrode, which are arranged on a substrate surface such that a facing area therebetween is varied in response to an input acceleration, wherein based on the capacitance realized by the moving electrode and fixed electrode, the capacitance variation due to the displacement of the moving electrode is detected so as to produce an acceleration signal.

The acceleration sensor having the servo circuit makes it possible to broaden the detection range compared with the acceleration sensor not equipped with the servo circuit because the movement of the moving electrode is limited in response to the output of the servo circuit. However, the range of the acceleration realized by the servo circuit stabilizing the moving electrode is limited by the electrostatic attraction and the weight of the moving electrode; hence, it is not easy to broaden the detection range.

The acceleration sensor in which the facing area between the moving electrode and fixed electrode is varied provides only a single kind of variation characteristic with regard to the facing area responding to the input acceleration; hence, it is not easy to broaden the detection range.

SUMMARY OF THE INVENTION

It is an object of the invention to provide an acceleration measurement method using an electrostatic-capacity-type acceleration sensor having a broadened acceleration detection range.

An electrostatic-capacity-type acceleration sensor comprises a plurality of capacitance detectors having pairs of moving electrodes and fixed electrodes that are arranged to face each other on the substrate surface, wherein facing areas are varied in response to an input acceleration. The capacitance detectors are constituted such that the facing areas between the moving electrodes and fixed electrodes differ from each other when the input acceleration is zero, so that each of the capacitance detectors produces an acceleration signal in response to the capacitance variation occurring between the paired electrodes thereof.

The acceleration sensor employs the aforementioned constitution adapted in each of the capacitance detectors in which the facing areas between the moving electrodes and fixed electrodes differ from each other so as to produce a variety of acceleration signals in response to capacitance variations occurring between the paired electrodes, it is possible to easily broaden the acceleration detection range for detecting the input acceleration by simply increasing the number of the capacitance detectors installed therein, wherein it is possible to provide each capacitance detector with a specific detection range suited thereto, thus realizing a high accuracy in the acceleration detection.

All of the moving electrodes provided for the capacitance detectors can be integrally formed together. Thus, it is possible to improve the integration of components and parts in the manufacturing of the acceleration sensor on the substrate surface by using the modem semiconductor manufacturing technology.

Each of the capacitance detectors comprises two pairs of moving electrodes and fixed electrodes, which are arranged in such a way that the facing area between the first moving electrode and first fixed electrode increases while the facing area between the second moving electrode and second fixed electrode decreases in response to the same input acceleration, whereby it produces an acceleration signal in response to a ratio or a difference between the first capacitance actualized between the first moving electrode and first fixed electrode and the second capacitance actualized between the second moving electrode and second fixed electrode. Thus, it is possible to noticeably improve the detection sensitivity in each of the capacitance detectors because the acceleration signal can be precisely produced in response to the ratio or difference between the two types of the capacitance.

In addition, the capacitance detectors can be constituted such that one capacitance detector has a relatively small facing area between the paired electrodes so as to produce an acceleration signal in response to a relatively small input acceleration, and the other capacitance detector has a relatively large facing area between the paired electrodes so as to produce an acceleration signal in response to a relatively large input acceleration. Thus, it is possible to detect the input acceleration with a high sensitivity in a relatively broad detection range.

An acceleration measurement method using an electrostatic-capacity-type acceleration sensor according to this invention is adapted to the system comprising first and second capacitance detectors each having a pair of a moving electrode and a fixed electrode in which the facing area between the paired electrodes in the second capacitance detector is set to be larger than the facing area between the paired electrodes in the first capacitance detector when an input acceleration is zero, a first detection means for producing first acceleration information in response to capacitance variation occurring between the moving electrode and fixed electrode in the first capacitance detector, and a second detection means for producing second acceleration information in response to capacitance variation occurring between the moving electrode and fixed electrode in the second capacitance detector.

The acceleration measurement method of this invention comprises an input step for inputting the first acceleration information and the second acceleration information from the first detection means and the second detection means respectively, a decision step for making a decision as to whether or not the first acceleration information exceeds the upper-limit value of detection that is determined in advance with respect to the first capacitance detector, and an output step for outputting the first acceleration information when the decision step produces a negative result and for outputting the second acceleration information when the decision step produces an affirmative result.

The aforementioned acceleration measurement method can be implemented in the form of programs executed in a computer.

According to the acceleration measurement method of this invention, it is possible for the acceleration measurement device to actualize high-accuracy acceleration measurement in the relatively broad range of detection and to avoid occurrence of detection error due to noise.

BRIEF DESCRIPTION OF THE DRAWINGS

These and other objects, aspects, and embodiments of the present invention will be described in more detail with reference to the following drawings, in which.

FIG; 6 is a block diagram showing an acceleration measurement device using an electrostatic-capacity-type acceleration sensor having characteristics shown in FIG. 5.

DESCRIPTION OF THE PREFERRED EMBODIMENTS

This invention will be described in further detail by way of examples with reference to the accompanying drawings.

Figure 1A:
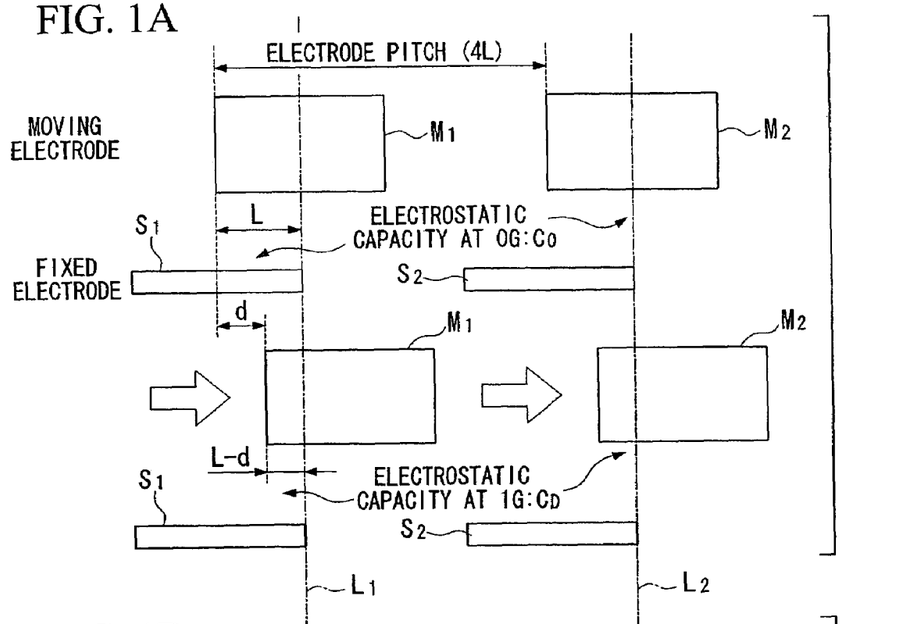
FIG. 1A shows a schematic arrangement of electrodes in a capacitance detector in which facing areas between moving electrodes and fixed electrodes are decreased in response to acceleration.
Figure 1B:
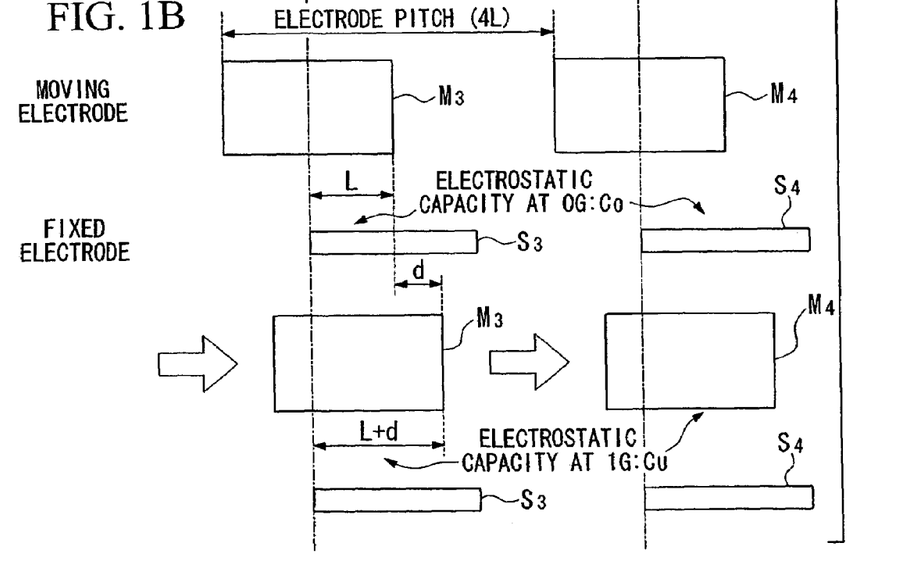
FIG. 1B shows a schematic arrangement of electrodes in a capacitance detector in which facing areas between moving electrodes and fixed electrodes are increased in response to acceleration.

FIGS. 1A and 1B show examples of arrangements of electrodes in capacitance detectors used for an electrostatic-capacity-type acceleration sensor in accordance with the preferred embodiment of the invention, wherein FIG 1A shows an arrangement of electrodes in the facing area decreasing side, and FIG. 1B shows an arrangement of electrodes in the facing area increasing side. With reference to FIGS. 1A and 1B, the operating principle of the electrostatic-capacity-type acceleration sensor will be described.

In FIGS. 1A and 1B, each of moving electrodes $M_1$ to $M_4$ has a rectangular shape in which the length is set to '2L' and the width is set to a certain value. Herein, the moving electrodes $M_1$ and $M_3$ are arranged along a dashed line $L_1$ in parallel with a prescribed distance therebetween such that the centers in their length directions match the dashed line $L_1$. Similarly, the moving electrodes $M_2$ and $M_4$ are arranged along a dashed line $L_2$ in parallel with a prescribed distance therebetween such that the centers in their length directions match the dashed line $L_2$. The dashed lines $L_1$ and $L_2$ are drawn in parallel with each other. In FIG. 1A, the moving electrodes $M_1$ and $M_2$ are arranged in parallel with an electrode pitch '4L' therebetween. In FIG. 1B, the moving electrodes $M_3$ and $M_4$ are arranged in parallel with an electrode pitch '4L' therebetween. Each of the moving electrodes $M_1$ to $M_4$ has a deadweight function, so that they can be collectively subjected to displacement in left-right directions with respect to the drawing sheet of FIGS. 1A and 1B in response to an input acceleration while maintaining the aforementioned relationship of arrangement.

In FIG. 1A, fixed electrodes $S_1$ and $S_2$ are respectively arranged under the moving electrodes $M_1$ and $M_2$, wherein the fixed electrode $S_1$ is arranged to oppositely face the left-half portion (whose length is 'L') of the moving electrode $M_1$, and the fixed electrode $S_2$ is arranged to oppositely face the left-half portion (whose length is 'L') of the moving electrode $M_2$. For the sake of convenience, the fixed electrodes $S_1$ and $S_2$ are drawn not to overlap with the moving electrodes $M_1$ and $M_2$ in FIG. 1A. Similarly, in FIG. 1B, fixed electrodes $S_3$ and $S_4$ are respectively arranged under the moving electrodes $M_3$ and $M_4$, wherein the fixed electrode $S_3$ is arranged to oppositely face the right-half portion (whose length is 'L') of the moving electrode $M_3$, and the fixed electrode $S_4$ is arranged to oppositely face the right-half portion (whose length is 'L') of the moving electrode $M_4$. For the sake of convenience, the fixed electrodes $S_3$ and $S_4$ are drawn not to overlap with the moving electrodes $M_3$ and $M_4$ in FIG. 1B.

In the above, there are provided four pairs of the fixed electrodes and the moving electrodes oppositely facing each other, namely, $M_1$-$S_1$, $M_2$-$S_2$, $M_3$-$S_3$, and $M_4$-$S_4$, each pair of which realizes a certain capacitance. At 0 G where the input acceleration is zero, each pair realizes the same capacitance '$C_0$'. Next, suppose that the input acceleration of 1 G is applied on the moving electrodes $M_1$ to $M_4$, all of which are moved rightwards as indicated by arrows in FIGS. 1A and 1B, and each of which is thus subjected to displacement by a distance 'd', the "paired" electrodes (i.e., $M_1$-$S_1$, and $M_2$-$S_2$) decrease the facing areas therebetween so that their capacitance decrease from $C_0$ to $C_D$ in FIG 1A, while the other "paired" electrodes (i.e., $M_3$-$S_3$, and $M_4$-$S_4$) increase the facing areas therebetween so that their capacitances increase from $C_0$ to $C_U$. Therefore, when the input acceleration acting on the moving electrodes $M_1$ to $M_4$ becomes greater than 1 G, the capacitance $C_D$ further decreases, and the capacitance $C_U$ further increases.

Figure 2:
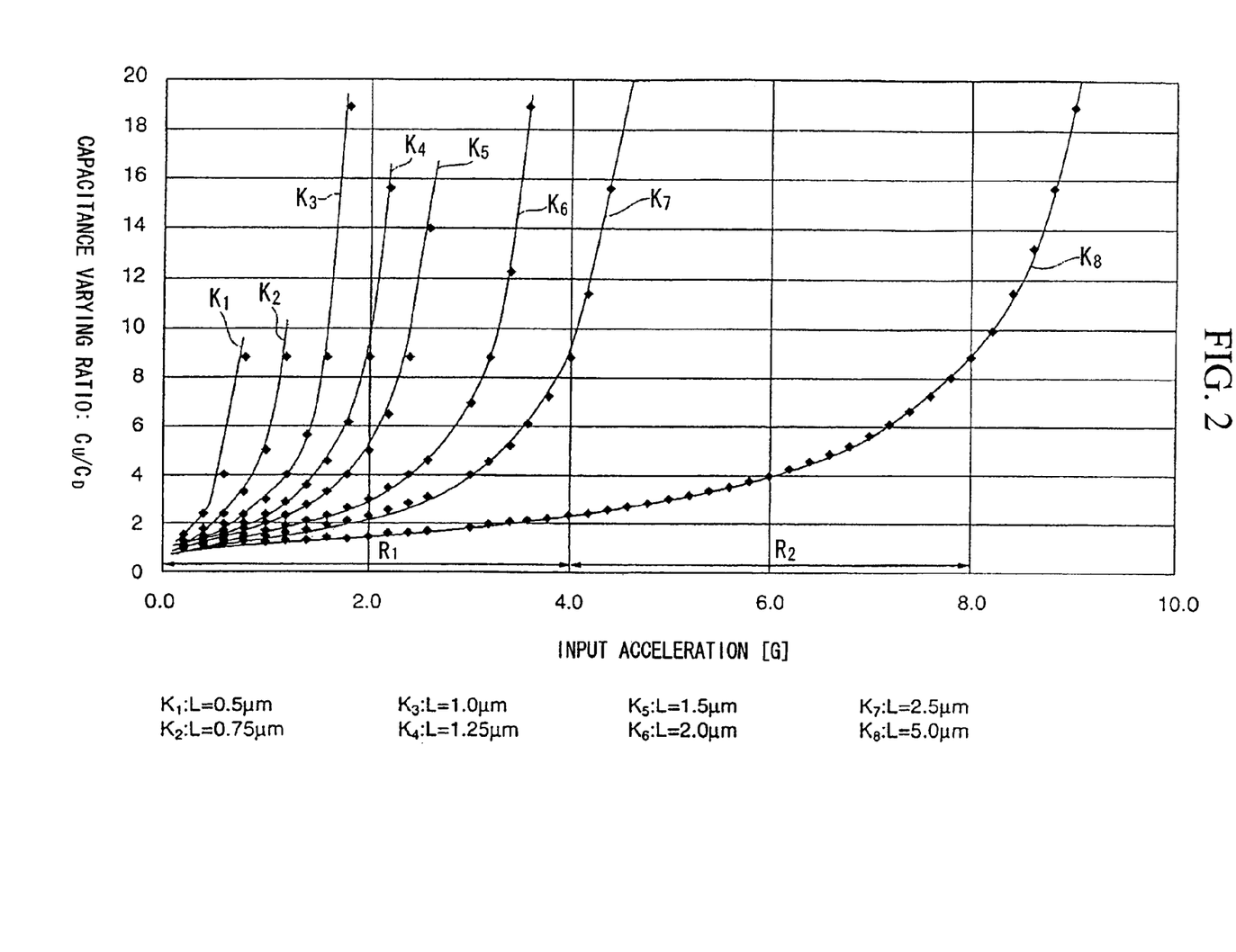
FIG. 2 is a graph showing curves $K_1$ to $K_8$ representing relationships between the input acceleration and capacitance varying ratio ($C_U/C_D$) with respect to various electrode overlap values (L)

FIG. 2 is a graph showing relationships between the input acceleration and the capacitance varying ratio $C_U/C_D$ with respect to various electrode overlap values, which are related to the electrode facing area 'L'. That is, the graph of FIG. 2 provides eight curves $K_1$, $K_2$, $K_3$, $K_4$, $K_5$, $K_6$, $K_7$, and $K_8$, each of which shows the relationship between the input acceleration and the capacitance varying ratio $C_U/C_D$ with regard to the electrode overlap value L, which is set to 0.5 µm, 0.75 µm, 1.0 µm, 1.25 µm, 1.5 µm, 2.0 µm, 2.5 µm, and 5.0 µm respectively.

According to the graph of FIG. 2, as the electrode overlap value L becomes greater, it becomes possible to detect 'greater' input acceleration. For this reason, the acceleration sensor of the present embodiment comprises a plurality of capacitance detectors having different electrode overlap values, each of which is adequately constituted to detect input acceleration in a certain detection range suited thereto. That is, a relatively small input acceleration can be detected using a capacitance detector whose electrode overlap value is relatively small, and a relatively large input acceleration is detected using a capacitance detector whose electrode overlap value is relatively large. Hence, it is possible to actualize a high sensitivity in detecting acceleration in a relatively broad range of detection.

With respect to each of the aforementioned curves (e.g., $K_1$), in order to avoid error detection due to noise, it is preferable not to use a certain region in which the capacitance varying ratio $C_U/C_D$ becomes large so as to make variation sharp.

Figure 3:
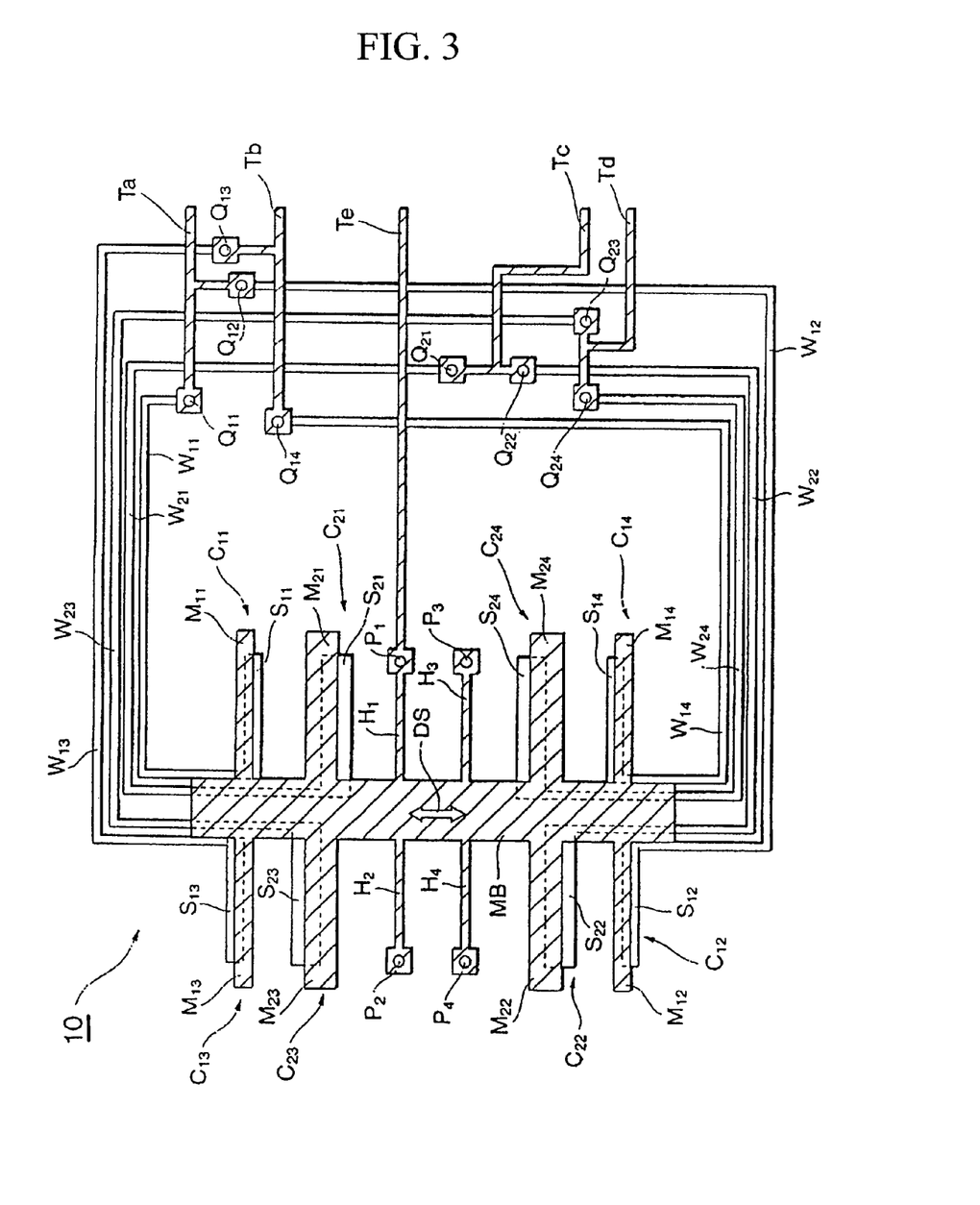
FIG. 3 is a plan view showing a layout of parts constituting an electrostatic-capacity-type acceleration sensor.

FIG. 3 shows an electrostatic-capacity-type acceleration sensor 10 in accordance with the pruned embodiment of the invention.

In the acceleration sensor 10, a moving member MB having a deadweight function is arranged on the surface of a silicon substrate and is supported by four support members $H_1$ to $H_4$ at both sides thereof such that it can be subjected to displacement in a direction DS in parallel with the substrate surface. The ends of the support members $H_1$ to $H_4$ are fixed at prescribed positions by fixing members $P_1$ to $P_4$ respectively. Four moving electrodes $M_{11}$, $M_{21}$, $M_{24}$, and $M_{14}$ are arranged on one side of the moving member MB and are projected in parallel with the substrate surface. In addition, four moving electrodes $M_{13}$, $M_{23}$, $M_{22}$, and $M_{12}$ are arranged on the other side of the moving member MB and are projected in parallel with the substrate surface. All of the moving electrodes $M_{11}$ to $M_{14}$ have the same length projecting from the moving member MB, and all of the moving electrodes $M_{21}$ to $M_{24}$ have the same length projecting from the moving member MB. In addition, all of the moving electrodes $M_{11}$ to $M_{14}$ have the same width, and all of the moving electrodes $M_{21}$ to $M_{24}$ have the same width that is greater than the width of the moving electrodes $M_{11}$ to $M_{14}$.

All of the moving member MB, the moving electrodes $M_{11}$–$M_{14}$ and $M_{21}$–$M_{24}$, and the support members $H_1$–$H_4$ are integrally combined together as a single assembly. Such an assembly can be formed by patterning conductive layers, which are made of a semiconductor or a metal and are deposited on an insulating film covering the substrate surface, wherein after the patterning, the insulating film is removed to allow movements of the moving member MB, the moving electrodes $M_{11}$–$M_{14}$ and $M_{21}$–$M_{24}$, and the support members $H_1$–$H_4$, for example. In addition, four fixing holes are formed at four fixing positions on the insulating film covering the substrate surface and are filled with conductive plugs, made of a semiconductor or a metal, thus forming the four fixing members $P_1$ to $P_4$.

Figure 4:
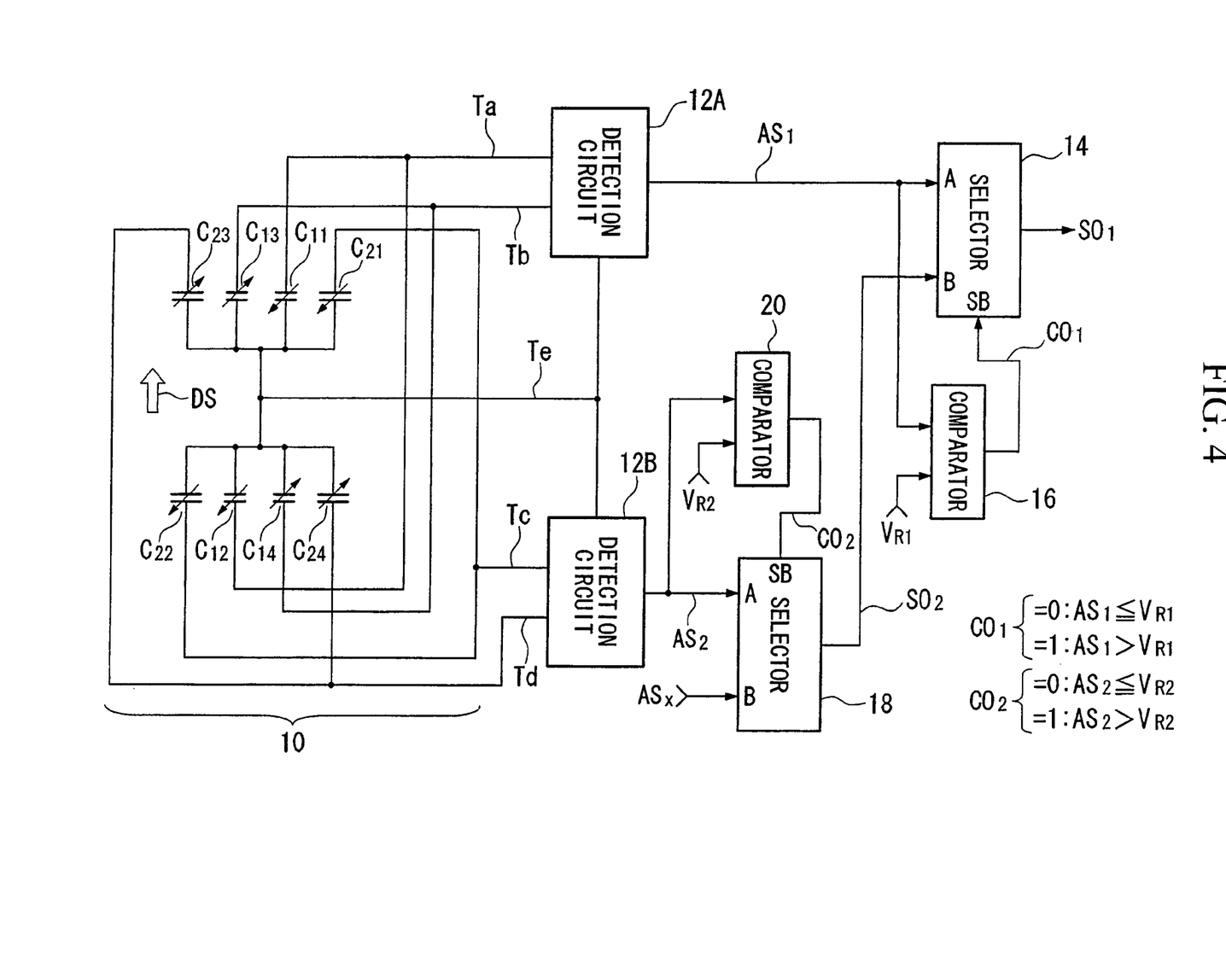
FIG. 4 is a block diagram showing an acceleration measuring circuit using the electrostatic-capacity-type acceleration shown in FIG. 3.

Four fixed electrodes $S_{11}$ to $S_{14}$ are arranged opposite to the moving electrodes $M_{11}$ to $M_{14}$ with relatively small facing areas therebetween, thus actualizing capacitances $C_{11}$ to $C_{14}$ having substantially the same value when the input acceleration is zero. In addition, four fixed electrodes $S_{21}$ to $S_{24}$ are arranged opposite to the moving electrodes $M_{21}$ to $M_{24}$ with relatively large facing areas therebetween, thus actualizing capacitances $C_{21}$ to $C_{24}$ having substantially the same value when the input acceleration is zero. Suppose that the moving member MB is subjected to displacement in the direction DS as indicated by an arrow in FIG. 4 (i.e., a forward direction in parallel with the sheet of FIG. 4), wherein the fixed electrodes $S_{11}$, $S_{12}$, $S_{21}$, and $S_{22}$ are associated with the moving electrodes $M_{11}$, $M_{12}$, $M_{21}$, and $M_{22}$ such that the facing areas therebetween are reduced so as to decrease the capacitances $C_{11}$, $C_{12}$, $C_{21}$, and $C_{22}$ respectively, while the fixed electrodes $S_{13}$, $S_{14}$, $S_{23}$, and $S_{24}$ are associated with the moving electrodes $M_{13}$, $M_{14}$, $M_{23}$, and $M_{24}$ such that the facing areas therebetween are increased so as to increase the capacitances $C_{13}$, $C_{14}$, $C_{23}$, and $C_{24}$ respectively. In FIG. 4, the capacitances $C_{11}$–$C_{14}$ and $C_{21}$–$C_{24}$ are associated with arrows, wherein a downward slanted arrow indicates that the corresponding capacitance is decreased, and an upward slanted arrow indicates that the corresponding capacitance is increased.

The aforementioned fixed electrodes $S_{11}$–$S_{14}$ and $S_{21}$–$S_{24}$ are formed by impurity-doped regions in which conductive impurities are selectively doped onto the substrate surface. Alternatively, they are formed by patterning conductive layers, made of a semiconductor or a metal, which are deposited on an insulating film covering the substrate surface.

Wiring layers $W_{11}$–$W_{14}$ and $W_{21}$–$W_{24}$ are respectively extended from the fixed electrodes $S_{11}$–$S_{14}$ and $S_{21}$–$S_{24}$. The wiring layers $W_{11}$ and $W_{12}$ are interconnected with a detection line Ta via connection members $Q_{11}$ and $Q_{12}$ respectively. The wiring layers $W_{13}$ and $W_{14}$ are interconnected with a detection line Tb via connection members $Q_{13}$ and $Q_{14}$ respectively. The wiring layers $W_{21}$ and $W_{22}$ are interconnected with a detection line Tc via connection members $Q_{21}$ and $Q_{22}$ respectively. The wiring layers $W_{23}$ and $W_{24}$ are interconnected with a detection line Td via connection members $Q_{23}$ and $Q_{24}$ respectively The support member $H_1$ is connected with a detection line Te.

The wiring layers $W_{11}$–$W_{14}$ and $W_{21}$–$W_{24}$ are formed by patterning such that their widths are reduced to be as small as possible in order to reduce parasitic capacitances thereof; the distances with the moving parts (i.e., MB, $M_{11}$–$M_{14}$, $M_{21}$–$M_{24}$) are increased to be as large as possible; and the electrode overlap values associated with the moving parts are reduced to be as small as possible. Similar to the fixed electrodes $S_{11}$–$S_{14}$ and $S_{21}$–$S_{24}$, the wiring layers $W_{11}$–$W_{14}$ and $W_{21}$–$W_{24}$ are formed by impurity-doped regions or conductive layers subjected to patterning. Eight connection holes are formed at prescribed positions on the insulating film covering the substrate surface and are filled with conductive plugs, made of a semiconductor or a metal, thus actualizing the connection members $Q_{11}$–$Q_{14}$ and $Q_{21}$–$Q_{24}$. Incidentally, the connection members (e.g., $Q_{11}$) can be formed by adopting the aforementioned treatment for use in the formation of the fixing members (e.g., $P_1$).

For example, after the wiring layers $W_{11}$–$W_{14}$ and $W_{21}$–$W_{24}$ are formed as impurity-doped regions, a first wiring layer forming process is performed on the insulating layer covering the substrate surface so as to form the fixed electrodes $S_{11}$–$S_{14}$ and $S_{21}$–$S_{24}$; then, a second wiring layer forming process is performed on the insulating film covering the fixed electrodes $S_{11}$–$S_{14}$ and $S_{21}$–$S_{24}$ so as to form the moving member MB, the moving electrodes $M_{11}$–$M_{14}$ and $M_{21}$–$M_{24}$, the support members $H_1$–$H_4$, and the detection lines Ta–Td. Thus, it is possible to increase distances between the wiring layers $W_{11}$–$W_{14}$ and $W_{21}$–$W_{24}$ and the moving parts (i.e., MB, $M_{11}$–$M_{14}$, $M_{21}$–$M_{24}$); hence, it becomes possible to reduce parasitic capacitances.

FIG. 4 shows an equivalent circuit of the acceleration sensor 10 shown in FIG. 3; specifically, it shows an example of an acceleration measuring circuit using the acceleration sensor 10 shown In FIG. 3. The acceleration measuring circuit of FIG. 4 is designed to measure the input acceleration in a range between 0 G and 8 G as shown in FIG. 2, wherein the curve $K_7$ is used for the measurement of a relatively small input acceleration that ranges from 0 G to 4 G, and the curve $K_8$ is used for the measurement of a relatively large input acceleration that ranges from 4 G to 8 G. Specifically, in a range $R_1$ wherein 0 G $\leq$ input acceleration$\leq$4 G, compared with the curve $K_8$, the curve $K_7$ provides a greater value of the capacitance varying ratio $C_U/C_D$, which in turn actualizes a high accuracy in measurement. In a range $R_2$ where 4 G <input acceleration$\leq$8 G, the curve $K_7$ includes a measurement-incapable region and is not used in measurement, whereas the curve $K_8$ is suitable in measurement. In order to avoid error detection due to noise, it is necessary not to use a sharp varying region of the curve $K_7$ with respect to the range $R_1$, and it is necessary not to use a sharp varying region of the curve $K_8$ with respect to the great input acceleration over 8 G, wherein these regions are excluded from the measurement.

A detection circuit 12A is connected with the detection lines Ta, Tb, and Te; and a detection circuit 12B is connected with the detection lines Tc, Td, and Te. Suppose that the capacitance varying characteristic of the capacitance detector, including the capacitances $C_{11}$ to $C_{14}$, against the input acceleration is shown by the curve $K_7$ shown in FIG. 2, while the capacitance varying characteristic of the capacitance detector, including the capacitances $C_{21}$ to $C_{24}$, against the input acceleration is shown by the curve $K_8$ shown in FIG. 2, for example. Herein, the capacitance varying ratio $C_U/C_D$ is calculated using $C_{11}$–$C_{14}$ and $C_{21}$–$C_{24}$ as follows:

$$\frac{C_{13} + C_{14}}{C_{11} + C_{12}}$$

$$\frac{C_{23} + C_{24}}{C_{21} + C_{22}}$$

With reference to the capacitance varying characteristic of the curve $K_7$, the detection circuit 12A produces an acceleration signal $AS_1$ representing the voltage related to a ratio (or a difference) between $(C_{13}+C_{14})$ and $(C_{11}+C_{12})$. With reference to the capacitance varying characteristic of the curve $K_8$, the detection circuit 12B produces an acceleration signal $AS_2$ representing the voltage related to a ratio (or a difference) between $(C_{23}+C_{24})$ and $(C_{21}+C_{22})$. The acceleration signal $AS_1$ is increased in level as the input acceleration increases from 0 G. The acceleration signal $AS_2$ is set such that it substantially matches the acceleration signal $AS_1$ in level at the input acceleration of 4 G, and it is further increased from that level as the input acceleration increases from 4 G.

A selector 14 has terminals A and B for receiving signals as well as a select terminal SB. Herein, the selector 14 selectively outputs the acceleration signal $SA_1$ when SB is low (or at '0'), while it selectively outputs a signal $SO_2$, which is output from a selector 18, when SB is high (or at '1'). A comparator 16 compares the acceleration signal $AS_1$ with reference voltage $V_{R1}$ so as to produce a comparison output $CO_1$, which is supplied to the select terminal SB of the selector 14. That is, the comparator 16 outputs $CO_1=0$ when $AS_1 \leq V_{R1}$; and it outputs $CO_1=1$ when $AS_1 > V_{R1}$.

The prescribed voltage related to the capacitance varying ratio $C_U/C_D$, which is read from the curve $K_7$ in FIG. 2 when the input acceleration is 4 G, is given as the reference voltage $V_{R1}$ supplied to the comparator 16. As a result, the selector 14 provides a selection output $SO_1$ corresponding to the acceleration signal $AS_1$, which is produced in response to the input acceleration in the range $R_1$ where 0 G$\leq$input acceleration$\leq$4 G.

The selector 18 has terminals A and B for receiving signals as well as a select terminal SB. That is, the selector 18 selectively outputs the acceleration signal $SA_2$ when SB is low (or at '0'), while it selectively outputs an out-of-range signal ASx representing that the input acceleration is out of the measurement range when SB is high (or at '1'). A comparator 20 compares the acceleration signal $AS_2$ with a reference voltage $VR_{R2}$ so as to provide a comparison output $CO_2$ to the select terminal SB of the selector 18. That is, the comparator 20 outputs $CO_2=0$ when $AS_2 \leq V_{R2}$; and it outputs $CO_2=1$ when $AS_2 > V_{R2}$.

The prescribed voltage related to the capacitance varying ratio $C_U/C_D$, which is read from the curve $K_8$ in FIG. 2 when the input acceleration is 8 G is given as the reference voltage $V_{R2}$ supplied to the comparator 20. As a result, the selector 18 provides a selection output $SO_2$ corresponding to the acceleration signal $AS_2$, which is produced in response to the input acceleration in the range $R_2$ where 4 G<input acceleration$\leq$8 G. In this case, the selector 14 is set so as to select the terminal B for receiving the selection output $SO_2$ of the selector 18 in response to the comparison output $CO_1$ of the comparator 16; hence, the selector 14 provides the selection output $SO_1$ corresponding to the acceleration signal $AS_2$.

When the acceleration signal $AS_2$ exceeds the reference voltage $V_{R2}$ (where $AS_2 > V_{R2}$), the comparison output $CO_2$ of the comparator 20 turns to '1'; hence, the selector 18 provides the selection output $SO_2$ corresponding to the out-of-range signal ASx. In this case, the selector 14 is set so as to select the terminal B for receiving the selection output $SO_2$ of the selector 18; hence, it provides the selection output $SO_1$ corresponding to the out-of-range signal Asx. An acceleration display (not shown) is provided to display an acceleration based on the acceleration signal $AS_1$ or $AS_2$ and to also display a message that the input acceleration is out of the measurement range in response to the out-of-range signal ASx.

The aforementioned acceleration measuring circuit of FIG. 4 is designed to perform measurement at a high accuracy with respect to a relatively broad range of 0 G$\leq$input acceleration$\leq$8 G, which is realized by the combination of the aforementioned ranges $R_1$ and $R_2$. Herein, the measurement regarding the input acceleration is performed by excluding sharp varying regions of the curves $K_7$ and $K_8$ shown in FIG. 2; hence, it is possible to reliably avoid occurrence of error detection due to noise. The acceleration measuring circuit of FIG. 4 is designed selectively using two curves $K_7$ and $K_8$ within the eight curves $K_1$ to $K_8$ shown in FIG. 2. Of course, it is possible to easily modify the acceleration measuring circuit using three or more curves.

Figure 5:
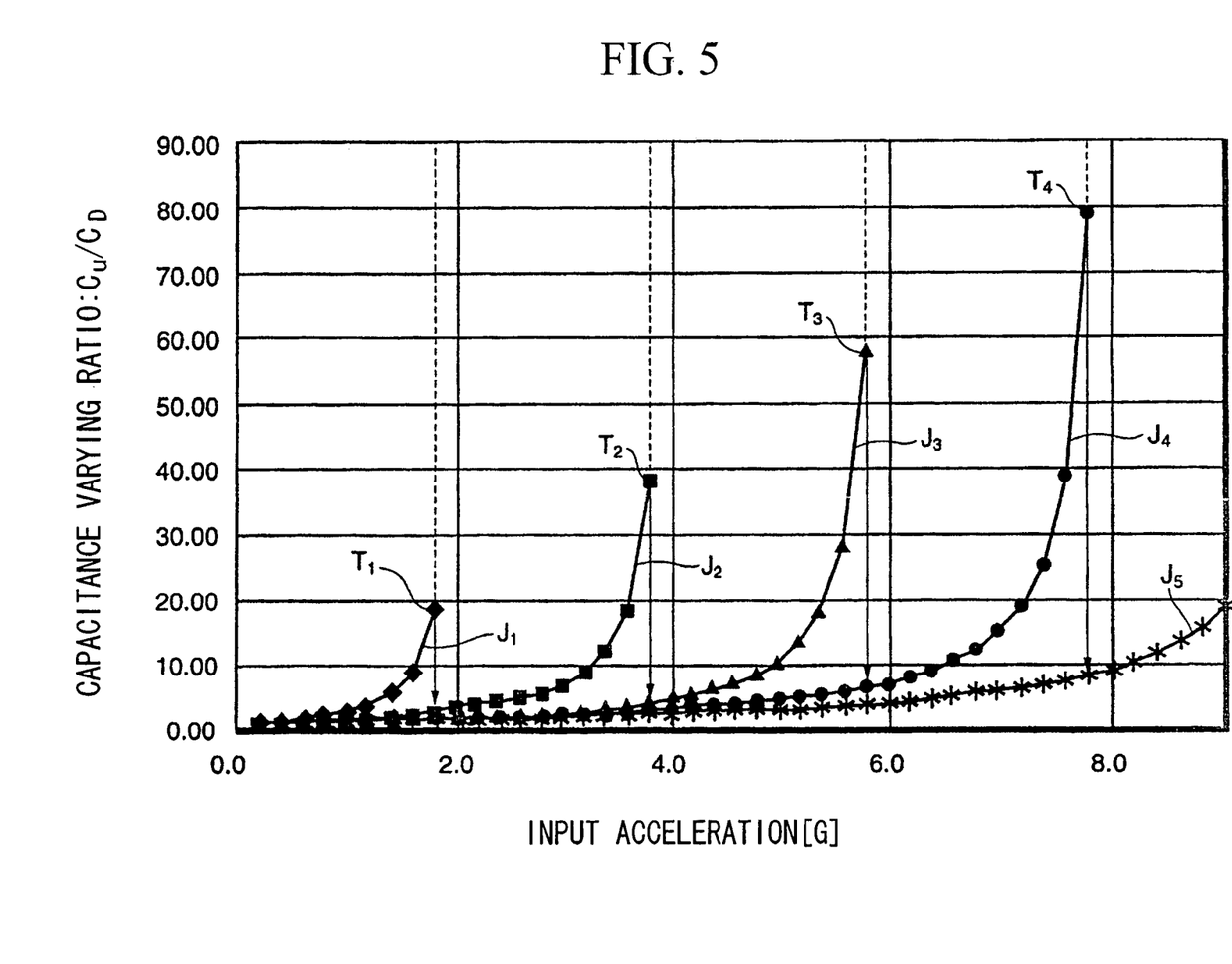
FIG. 5 is a graph showing curves $J_1$ to $J_5$ representing relationships between the input acceleration and capacitance varying ratio ($C_U/C_D$) with respect to various electrode overlap values (L)

FIG. 5 is a graph showing the relationship between the input acceleration and capacitance varying ratio $C_U/C_D$ in other examples of electrostatic-capacitance-type acceleration sensors using various electrode overlap values.

The electrostatic-capacitance-type acceleration sensors having characteristics of FIG. 5 are characterized in that the electrode displacement is set to 0.5 μm when the input acceleration is 1 G, so that the electrode displacement d is varied linearly in response to the input acceleration. Herein, various electrode overlap values L are gradually increased in the order of $L_1$, $L_2$, $L_3$, ... $L_n$, wherein $L_n=L_{n-1}+1$ (where $L_0=0$) [μm]. The graph of FIG. 5 present five curves $J_1$ to $J_5$, each showing the capacitance varying ratio $C_U/C_D$ (=(L+d)/(L−d)), with respect to n=1 to n=5 in the input acceleration range of 0 G to 8 G. Specifically, the curves $J_1$, $J_2$, $J_3$, $J_4$, and $J_5$ show variations of the capacitance varying ratio (L+d)/(L−d) with respect to $L_1=1$ μm, $L_2=2$ μm, $L_3=3$ μm, $L_4=4$ μm, and $L_5=5$ μm respectively.

When the electrode displacement d approaches the electrode width, the capacitance varying ratio (L+d)/(L−d) rapidly increases as shown in dotted lines in FIG. 5 so as to diverge. Herein, a prescribed upper limit value is set to the electrode displacement d with respect to each curve, whereby acceleration measurement is performed by changing over characteristics from one curve to another in such a way that when the electrode displacement d exceeds the upper limit value of the curve $J_1$, it proceeds to the next curve $J_2$; then, when the electrode displacement d exceeds the upper limit value of the curve $J_2$, it proceeds to the next curve $J_3$. That is, prescribed upper limit values are set to electrode displacements such as $d_1=0.9$ μm, $d_2=1.9$ μm, $d_3=2.9$ μm, ... Herein, threshold $T_n$ for changing over the capacitance varying ratio $C_U/C_D$ from one curve to another is expressed as follows:

$$T_n = \frac{L_n + d_n}{L_n - d_n} = T_{n-1} + 20$$

Using the aforementioned formula, it is possible to set the threshold $T_n$ in relation to the electrode overlap value $L_n$ and the upper limit value $d_n$ for the electrode displacement d. Specifically, FIG. 5 describes thresholds $T_1=19$, $T_2=39$, $T_3=59$, and $T_4=79$ being set with respect to the curves $J_1$, $J_2$, $J_3$, and $J_4$ respectively. Table 1 shows relationships between $L_n$, $d_n$, and $T_n$.

TABLE 1

| Electrode Overlap Value [μm] | Upper Limit Value Of Electrode Displacement [μm] | Threshold For Capacitance Varying Ratio $C_U/C_D$ |
|---|---|---|
| $L_1$ 1 | $d_1$ 0.9 | $T_1$ 19 |
| $L_2$ 2 | $d_2$ 1.9 | $T_2$ 39 |
| $L_3$ 3 | $d_3$ 2.9 | $T_3$ 59 |
| $L_4$ 4 | $d_4$ 3.9 | $T_4$ 79 |
| . | . | . |
| . | . | . |
| . | . | . |
| $L_n$ $L_{n-1}+1$ | $d_n$ $d_{n-1}+1$ | $T_n$ $T_{n-1}+20$ |

Figure 6:
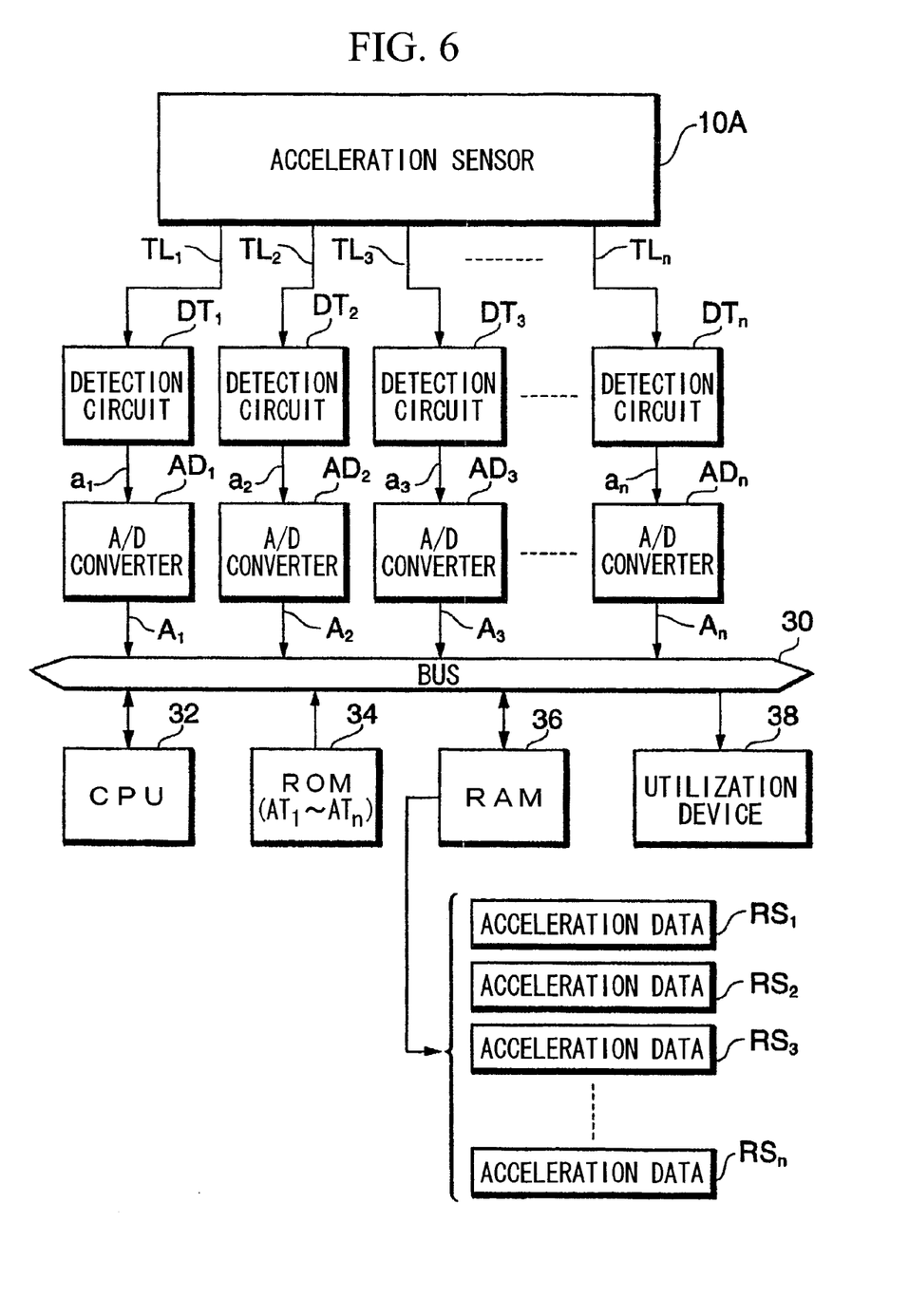

FIG. 6 is a block diagram showing the constitution of an acceleration measurement device using an electrostatic-capacitance-type acceleration sensor having the characteristics of FIG. 5, wherein the acceleration measurement device is designed such that the measurement processing is controlled by a microcomputer, for example.

In FIG. 6, an acceleration sensor 10A is configured similar to the foregoing acceleration sensor 10, which is described in conjunction with FIGS. 1A, 1B, 2, 3, and 4. Specifically, the acceleration sensor 10A differs from the foregoing acceleration sensor 10 in that it has 'n' capacitance detectors respectively corresponding to the aforementioned characteristic curves $J_1$ to $J_n$ (e.g., n=5). In a manner similar to that of the foregoing detection circuits 12A and 12B, a plurality of detection circuits $DT_1$ to $DT_n$ detect output voltages of the capacitance detectors of the acceleration sensor 10A, which are produced in response to capacitance varying ratios $C_U/C_D$ in correspondence with the characteristic curves $J_1$ to $J_n$ respectively, as acceleration signals. The detection circuits $DT_1$ to $DT_n$ are connected with detection lines $TL_1$ to $TL_n$ extended from the capacitance detectors in correspondence with the characteristic curves $J_1$ to $J_n$ respectively. Each of the detection lines $TL_1$ to $TL_n$ includes three detection lines, which correspond to the foregoing detection lines Ta, Tb, and Te in FIG. 4, whereas FIG. 6 merely shows a single line as the representation of each of the detection lines $DT_1$ to $DT_n$ for the sake of convenience.

The detection circuits $DT_1$ to $DT_n$ output analog acceleration signals $a_1$ to $a_n$, which are respectively supplied to A/D converters (i.e., analog-to-digital conversion circuits) $AD_1$ to $AD_n$, which in turn produce 'digital' acceleration data $A_1$ to $A_n$. The acceleration data $A_1$ to $A_n$ represent values of the acceleration signals $a_1$ to $a_n$ respectively.

The A/D converters $AD_1$ to $AD_n$ are connected with a bus 30, which is also connected with a CPU 32, a ROM 33, a RAM 36, and a utilization device 38.

The CPU 32 executes measurement processes in accordance with programs stored in tie ROM 34. Details of the measurement processes will be described later with reference to FIG. 7. Other than programs, the ROM 34 also stores reference data $AT_1$ to $AT_n$, which represent reference acceleration values (i.e., upper limit values in detection) in correspondence with thresholds $T_1$ to $T_n$ set for the capacitance varying ratios $C_U/C_D$.

The RAM 36 contains storage areas that are used as registers when the CPU 32 performs measurement processes. As registers, there are provided registers $RS_1$ to $RS_n$ in correspondence with the A/D converters $AD_1$ to $AD_n$ respectively. The registers $RS_1$ to $RS_n$ input the acceleration data output from the A/D converters $AD_1$ to $AD_n$ respectively.

The utilization device 38 utilizes the acceleration data set to the registers $RS_1$ to $RS_n$, wherein it is the device that does not only detect existence of acceleration but also performs measurement on acceleration in a relatively broad range or performs highly accurate measurement on the acceleration ranging from a small acceleration to a large acceleration caused by impact or collision. Specifically, it is actualized by a display, an electronic device such as an electronic game terminal and a portable telephone (or a cellphone), and an air-bag drive device adapted to an automobile, for example.

Figure 7:
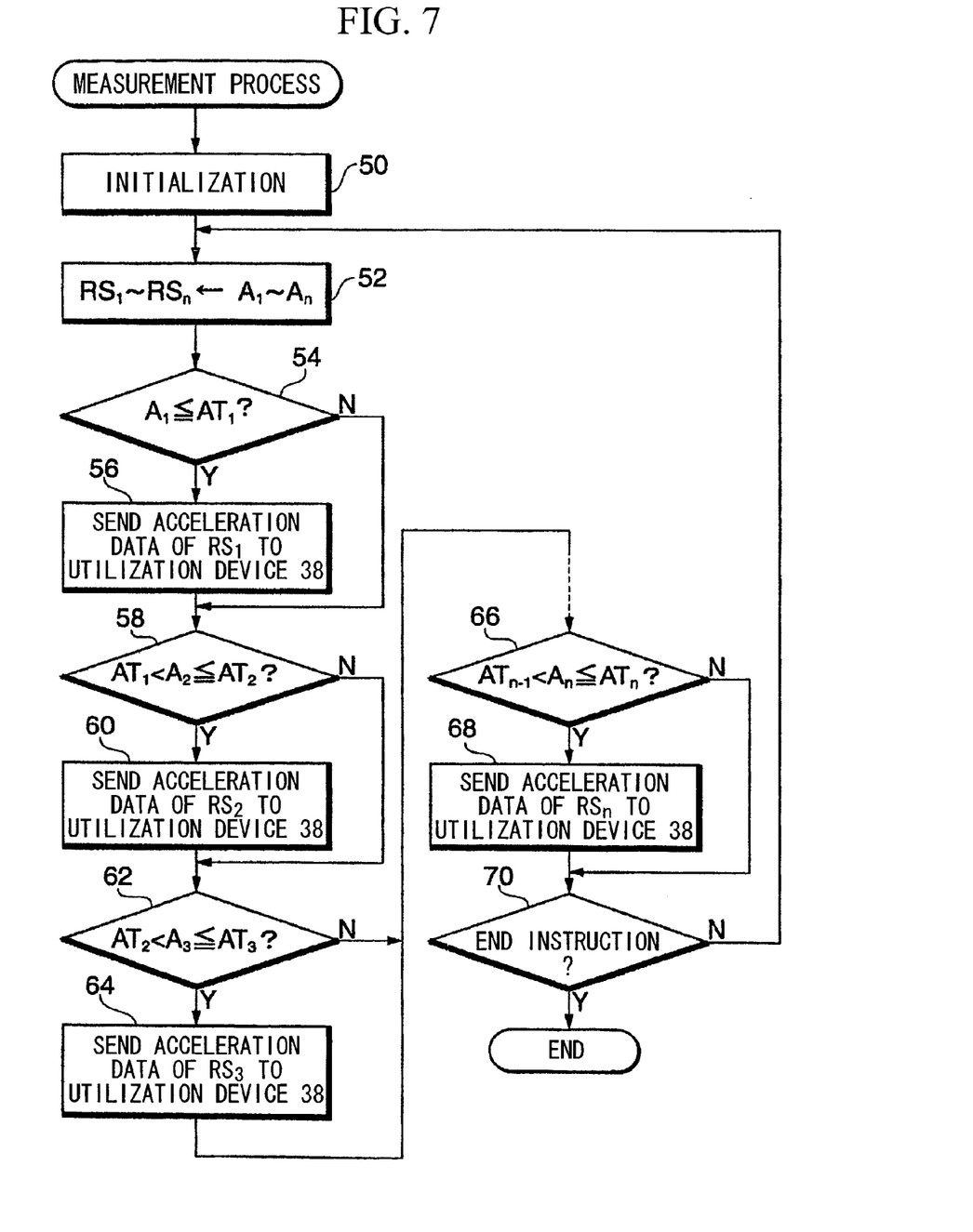
FIG. 7 is a flowchart showing steps implemented in acceleration measurement.

FIG. 7 shows an example of the measurement process, which is started when a power switch (not shown) is turned on. First, the CPU 32 proceeds to step 50 so as to perform an initialization process, wherein '0' is set to all of the registers $RS_1$ to $RS_n$.

Then, the CPU 32 proceeds to step 52 in which it inputs the acceleration data $A_1$ to $A_n$ from the A/D converters $AD_1$ to $AD_n$ respectively, so that the acceleration data $A_1$ to $A_n$ are set to the registers $RS_1$ to $RS_n$ respectively. In step 54, a decision is made as to whether or not the acceleration data $A_1$ of the register $RS_1$ is equal to or smaller than the reference acceleration designated by the reference acceleration value designated by the reference data $AT_1$. If a decision result is 'YES' (Y), the CPU 32 proceeds to step 56 in which the acceleration data $A_1$ of the register $RS_1$ is sent to the utilization device 38. This realizes the characteristic curve $J_1$ shown in FIG. 5.

If the decision result of step 54 is 'NO' (N), or when the step 56 is completed, the CPU 32 proceeds to step 58 in which a decision is made as to whether or not the acceleration designated by the acceleration data $A_2$ of the register $RS_2$ is greater than the reference acceleration designated by the reference data $AT_1$ and is equal to or smaller than the reference acceleration designated by the reference data $AT_2$. When a decision result is 'YES' (Y), the CPU 32 proceeds to step 60 in which the acceleration data $A_2$ of the register $RS_2$ is sent to the utilization device 38. This realizes the characteristic curve $J_2$ shown in FIG. 5.

If the decision result of step 58 is 'NO' (N), or when the step 60 is completed, the CPU 32 proceeds to step 64 in which a decision is made as to whether or not the acceleration designated by the acceleration data $A_3$ of the register $RS_3$ is greater than the reference acceleration designated by the reference data $AT_2$ and is equal to or smaller than the reference acceleration designated by the reference data $AT_3$. When a decision result is 'YES' (Y), the CPU 32 proceeds to step 64 in which the acceleration data $A_3$ of the register $RS_3$ is sent to the utilization device 38. This realizes the characteristic curve $J_3$ shown in FIG. 5.

Thereafter, in a manner similar to that of the aforementioned processing realizing the curve $J_3$, steps similar to the steps 62 and 64 are performed to realize the curve $J_4$. When n=5, in step 66, a decision is made as to whether or not the acceleration designated by the acceleration data $A_5$ of the register $RS_5$ is greater than the reference acceleration designated by the reference data $AT_4$ and is equal to or smaller than the reference acceleration designated by the reference data $AT_5$. When a decision result is 'YES' (Y), the CPU 32 proceeds to step 68 in which the acceleration data $A_5$ of the register $RS_5$ is sent to the utilization device 38. This realizes the characteristic curve $J_5$ shown in FIG. 5.

When the decision result of step 66 is 'NO' (N), or when the step 68 is completed, the CPU 32 proceeds to step 70 so as to make a decision as to whether or not the power switch is turned off to issue an end instruction. When a decision result is 'NO' (N), the CPU 32 proceeds back to the step 52, thus repeating the aforementioned steps 52–68. When the decision result of step 70 becomes 'YES' (Y), the CPU 32 detects an end of processing.

According to the aforementioned measurement method, it is possible to perform highly accurate measurement on acceleration by use of the curves $J_1$ to $J_5$ in the relatively broad range of detection, i.e., 0 G≦(input acceleration)≦8 G. Herein, the present embodiment performs acceleration detection by not using the sharp rise portions of the curves $J_1$ to $J_5$; hence, it is possible to avoid occurrence of detection error due to noise. Incidentally, the present embodiment sets n=5, which is not necessarily limited and can be changed to n=6 or more, for example.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An acceleration measurement method adapted to an electrostatic-capacity-type acceleration sensor comprising a first capacitance detector and a second capacitance detector both of which have moving electrodes and fixed electrodes arranged on a substrate surface so that facing areas therebetween are varied in response to input acceleration, wherein said second capacitance detector sets the facing areas between the moving electrodes and the fixed electrodes to be larger than those of the first capacitance detector when the input acceleration is zero, said acceleration measurement method comprising the steps of:
   inputting first acceleration information representing capacitance variations detected between the moving electrodes and the fixed electrodes in the first capacitance detector;
   inputting second acceleration information representing capacitance variations detected between the moving electrodes and the fixed electrodes in the second capacitance detector;
   making a decision as to whether or not the first acceleration information exceeds an upper limit value that is set in advance with respect to the first capacitance detector;
   if a decision result is 'NO', outputting the first acceleration information; and
   if the decision result is 'YES', outputting the second acceleration information.

2. A computer-readable medium containing a program for controlling a computer to execute an electrostatic-capacity-type acceleration sensor comprising a first capacitance detector and a second capacitance detector both of which have moving electrodes and fixed electrodes arranged on a substrate surface so that facing areas therebetween are varied in response to input acceleration, wherein said second capacitance detector sets the facing areas between the moving electrodes and the fixed electrodes to be larger than those of the first capacitance detector when the input acceleration is zero, said program for acceleration measurement method comprising:
   in puffing first acceleration information representing capacitance variations detected between the moving electrodes and the fixed electrodes in the first capacitance detector;
   inputting second acceleration information representing capacitance variations detected between the moving electrodes and the fixed electrodes in the second capacitance detector;
   making a decision as to whether or not the first acceleration information exceeds an upper limit value that is set in advance with respect to the first capacitance detector;
   if a decision result is 'NO', outputting the first acceleration information; and
   if the decision result is 'YES', outputting the second acceleration information.

3. The acceleration measurement method adapted to an electrostatic-capacity-type acceleration sensor according to claim 1, wherein the sensor is connected with a plurality of detection circuits, said acceleration measurement method further comprising the step of:
   making a determination with respect to each of outputs of the detection circuits.

* * * * *